Figure 1:
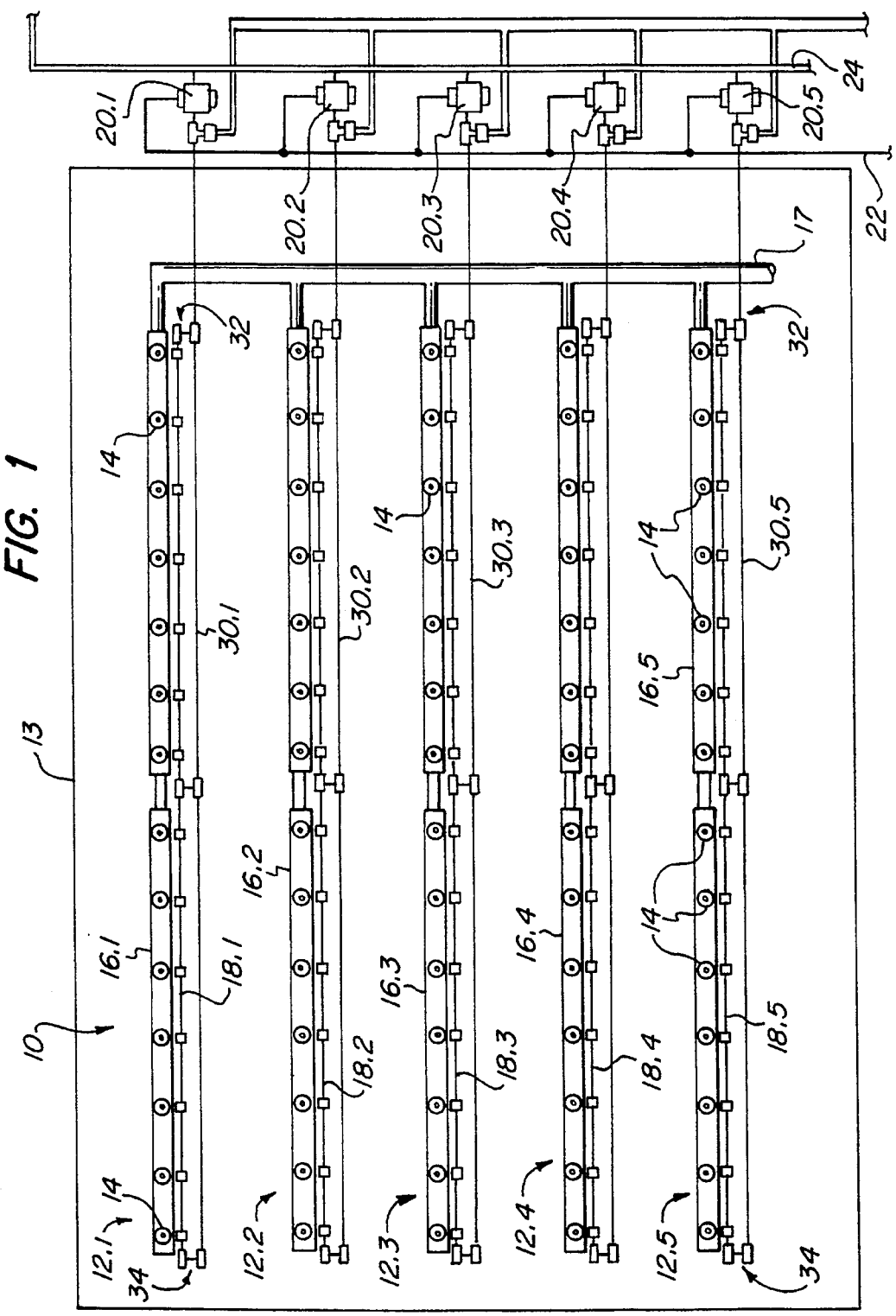

United States Patent [19]
Reens et al.

[11] Patent Number: 5,523,028
[45] Date of Patent: Jun. 4, 1996

[54] FOGGER BAR ASSEMBLY

[75] Inventors: Daniel J. Reens, Trumbull; Robert Karnoff, Monroe, both of Conn.

[73] Assignee: Cool Fog Sysems, Inc., Norwalk, Conn.

[21] Appl. No.: 368,908

[22] Filed: Jan. 5, 1995

[51] Int. Cl.$^6$ ........................ B01F 3/04
[52] U.S. Cl. ............... 261/81; 261/116; 239/8; 239/76; 239/524
[58] Field of Search .............. 261/116, 81; 239/8, 239/76, 524

[56] References Cited

U.S. PATENT DOCUMENTS

| | | | |
|---|---|---|---|
| 3,084,874 | 4/1963 | Jones et al. | 239/8 |
| 3,137,446 | 6/1964 | Masuda | 239/76 |
| 3,618,856 | 11/1971 | Sachnik | 239/8 |
| 3,793,762 | 2/1974 | Steins | 239/8 |
| 3,866,833 | 2/1975 | Shibata et al. | 239/76 |
| 3,917,166 | 11/1975 | Hildebrandt et al. | 239/8 |
| 3,940,071 | 2/1976 | Lassiter, Sr. | 239/524 |
| 4,103,827 | 8/1978 | Kumazawa | 239/8 |
| 4,474,680 | 10/1984 | Kroll | 239/8 |

*Primary Examiner*—Tim R. Miles
*Attorney, Agent, or Firm*—St. Onge Steward Johnston & Reens

[57] ABSTRACT

A fogging system and fogger bar assembly are disclosed wherein a plurality of foggers are mounted on an array and operatively connected to air and primary water lines. A second water line is introduced in parallel with the primary water lines to provide an equalization of pressure in the primary water lines and dampen vibrations from the foggers. Check valves are used near the foggers to reduce the feedback of undesirable shocks and noise from the foggers into the primary water lines. A system is described wherein a plurality of pressure regulators are used to supply the same pressure to primary water lines in a system where a plurality of fogger bar assemblies are used in a vertical orientation.

4 Claims, 4 Drawing Sheets

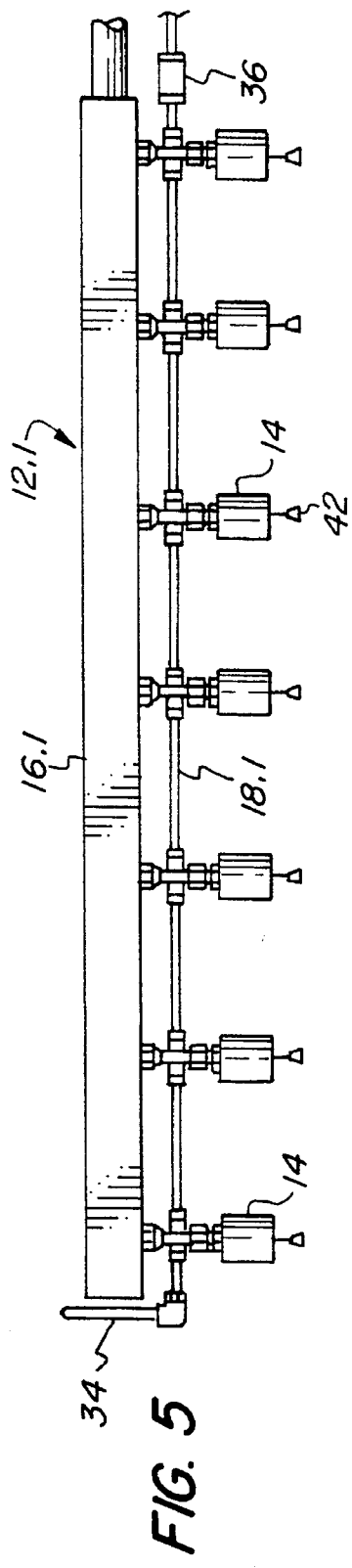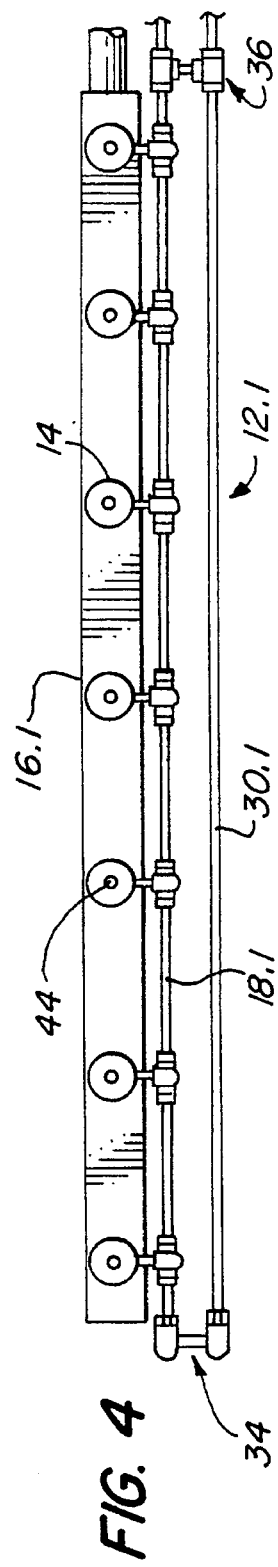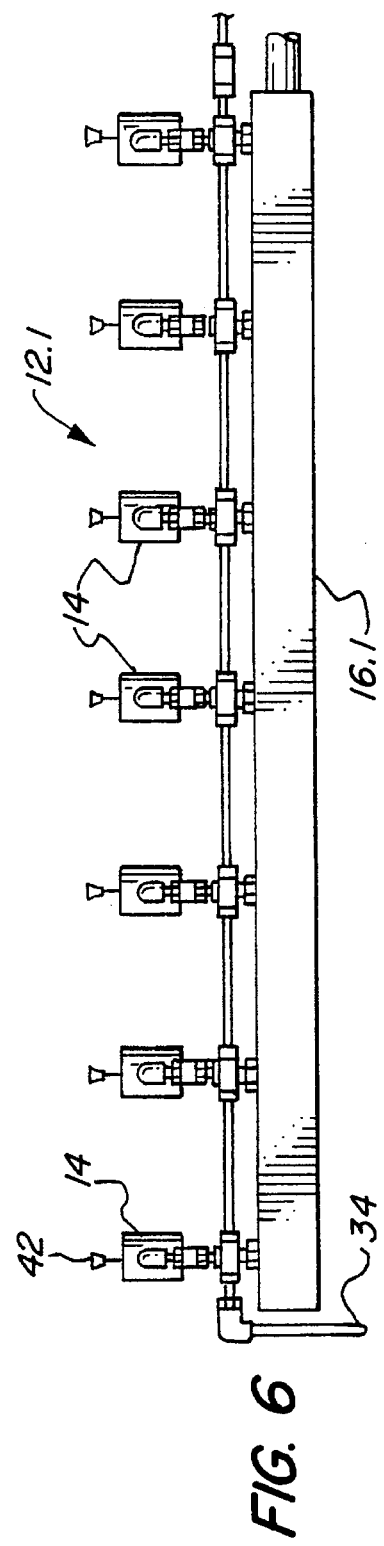

FOGGER BAR ASSEMBLY

FIELD OF THE INVENTION

This invention generally relates to humidification systems and more particularly to a fogger bar assembly system using a plurality of foggers mounted on bars to generate patterns of fog.

BACKGROUND OF THE INVENTION

Foggers for the humidification of air have been used and described in a variety of forms. One such fogger is shown and described in a copending patent application entitled Method And Apparatus For Evaporative Cooling Of Air Leading Into A Gas Turbine Engine and filed in the U.S. Patent Office bearing application Ser. No. 163,115 on Dec. 6, 1993 now U.S. Pat. No. 5,463,873, and owned by the same assignee as this application. The contents of this application and any patent as may issue therefrom are incorporated herein by reference thereto.

The fogger is shown arranged in arrays and mounted on bars or conduits which supply pressurized air and water to the foggers. The air leading into a fogger entrains a flow of water and the mixture is impacted upon a resonator with which a fog pattern is produced into an airstream to humidify the air. The water and air are supplied with a preselected pressure difference, with the air at a higher pressure that is typically in the range of about 17 psi. The fog pattern from the foggers can be regulated by varying the pressures of the air and water lines together while keeping the differential pressure between the air and water lines about the same.

In the arrangement of the foggers as described in the aforementioned patent application the foggers are arranged in arrays along bars with a number of bars spaced in a vertical array. The vertical displacements of the bars tends to introduce variations in the air and water pressure differentials at the foggers throughout the arrays, thus leading to potential nonuniform operation from fogger to fogger and thus vary the uniformity of the exposure of the air stream to fog.

When a large number of loggers are mounted to the same air and water conduits there is a tendency for vibrations emanating from the static pressure fluctuations to feed back into the supply lines. In the aggregate within the arrays such feedback may lead to large vibrations and water flow impedence and it is desirable to keep such effects to a minimum.

SUMMARY OF THE INVENTION

It is, therefore, an object of the invention to provide an air humidification system with foggers and which is capable of providing a uniform fog pattern from the respective foggers used in the system. It is a further object of the invention to provide a humidification system with foggers wherein the large vibrations and water flow impedence are damped to a satisfactory level.

This is achieved in one embodiment in accordance with the invention by utilizing a second water conduit that runs parallel to a primary conduit connected to foggers in an array. The second conduit is operatively connected to near and far ends of the primary water conduit so as to equalize pressures therein and assist in the dampening of vibrations tending to be fed back from the foggers connected to the primary water conduit.

Further dampening of vibrations is achieved in an embodiment of the invention by inserting a check valve between each of the foggers and the primary water conduit. The check valve is so oriented as to enable the passage of water to the fogger while tending to inhibit fogger generated pulsations to be fed back into the primary water conduit.

As described herein for a preferred embodiment of the invention a consistent pressure differential between the water and air at the foggers on respectively different fogger arrays is achieved. This is done by regulating the pressure in each primary water conduit connected to an array of foggers. In this manner the variations in height between stacked arrays of foggers can be compensated for and a consistent pressure differential established at each fogger throughout the fogging system.

It is, therefore, a further object of the invention to provide a fogging system with which consistent operating pressures is achieved to provide a reliable and repeatable operation.

These and other objects and advantages of the invention can be understood from the following detailed description of a preferred embodiment as illustrated in the accompanying drawings.

BRIEF DESCRIPTION OF THE DRAWINGS

FIG. 1 is a front elevational view of a multiple array fogging system in accordance with the invention without the controls used to modulate the fog produced by the foggers;

FIG. 2 is a perspective enlarged view of a small portion of a fogger array of this invention;

FIG. 3 is a perspective view of one array of foggers in accordance with the invention;

FIG. 4 is a side view in elevation of a portion of the fogger array shown in FIG. 3;

FIG. 5 is a top view of the array shown in FIG. 4; and

FIG. 6 is a bottom view of the array shown in FIG. 4.

DETAILED DESCRIPTION OF THE DRAWINGS

With reference to FIGS. 1 a fogging system 10 is shown formed of a plurality of fogger arrays 12.1–12.5 mounted in bar assemblies which are in a vertically stacked and spaced relationship above one another inside an air handler 13. The number of arrays 12 can be varied with the orientation of the arrays dependent upon the direction of the air flow in the air handler where the arrays are typically mounted. A single array can be used with the number of arrays being a function of the amount of air that needs to be humidified and the speed of the air flow. Each array 12 consists of a plurality of foggers 14 of the type as described in the aforementioned copending patent application.

The foggers 14 are operatively connected to air conduits 16.1–16.5 and primary water conduits 18.1–18.5. Pressure in the air lines 16 and the main air line 17 is regulated in a manner, not shown, but as set forth in the copending patent application and the pressure in the water conduits 18 is regulated with pressure regulators 20.1–20.5, one for the water conduit 18 in each array 12. The control over the pressure regulators 20 is obtained from a single line 22 from a common panel control, not shown, but which could be of the type as shown in the aforementioned patent application. Pressure in the main water line 24 is set sufficiently high to accommodate the range of control needed for the water conduits 18.

The use of a pressure regulator 20 with each array 12 enables the production of the same water pressure in each of the water conduits 18 in the vertically arranged arrays 12 and thus compensate for the different heights of the respective arrays 12.1–12.5. The pressure regulators 20 further assist in isolating the main water line 24 from vibrations generated by the operation of all the foggers 14 in system 10.

The operation of foggers 14 is sensitive to the pressure differential between the air and water conduits 16, 18. Accordingly, it is desirable to maintain that pressure difference the same at each fogger 14. Since each fogger uses water and generates pressure waves the average pressure in the water conduit 18 is affected and thus also the pressure differential with respect to the air conduit 16. This variation in pressure differential tends to introduce uneven fog patterns from the foggers 14 throughout system 10 and in the aggregate reduces the effectiveness of system 10 in humidifying the air flowing through air handler 13.

Accordingly, a second water conduit 30 is employed along each array 12 and is connected to the primary water lines 18 at the near and far ends 32, 34 of the arrays 12. The connection at the near ends 32 assures that the water pressure in the second water conduit is at the level produced by the nearby water pressure regulator 20. The connection at the far end 34 provides an equalizing pressure to the more remotely located foggers 14 and thereby also dampens vibrations and water flow impedance introduced by the foggers.

Figure 3:
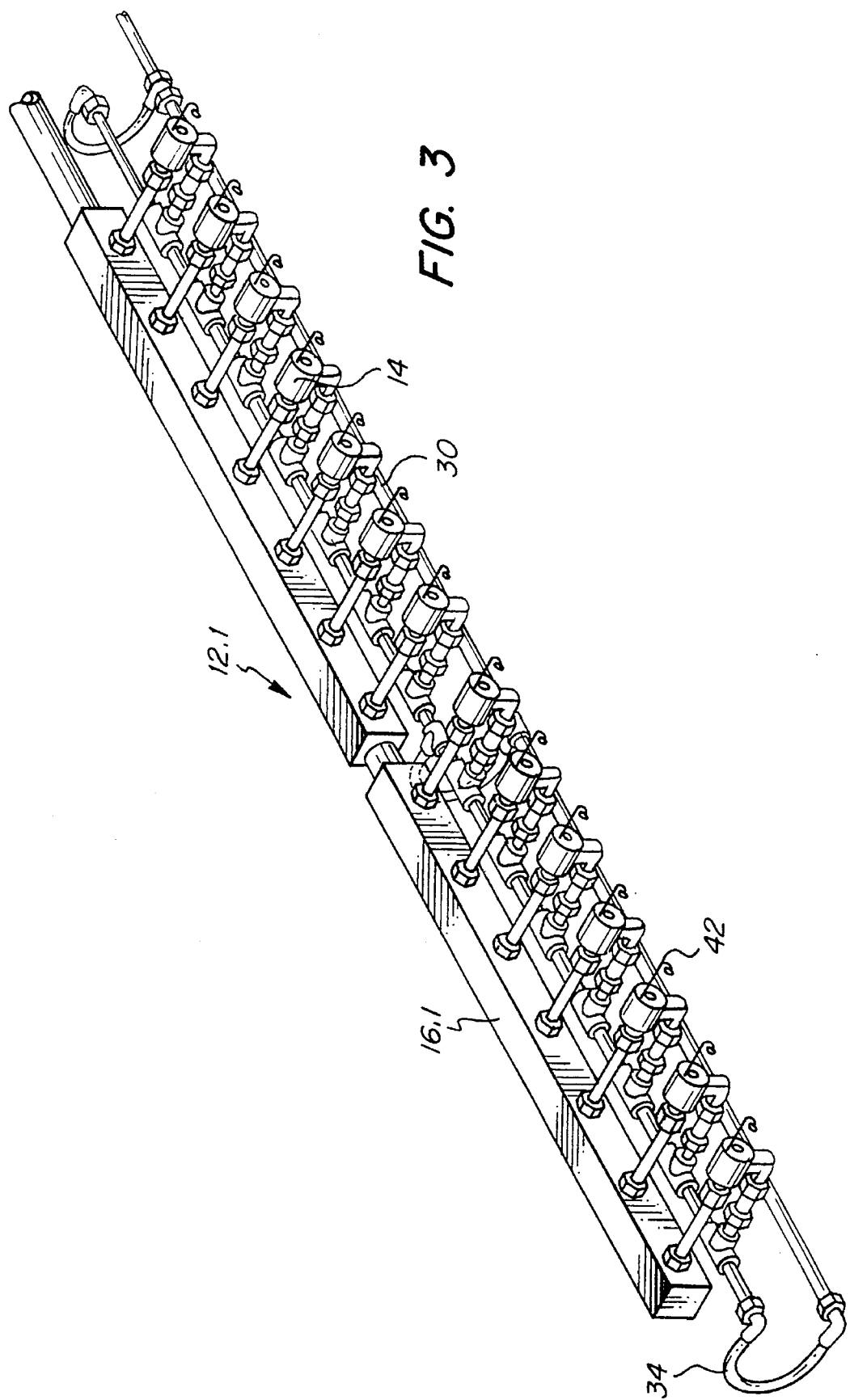

The sizes of the second water lines 30 are generally commensurate with those employed for the primary water lines 18. In case of very long arrays, such as shown in FIGS. 1 and 3, the second water conduits 30 can be connected to the primary water lines 18 at additional places such as the middle of the array at 36. Generally a second water conduit is recommended whenever there are more than about three foggers 14 in an array 12.

Figure 2:
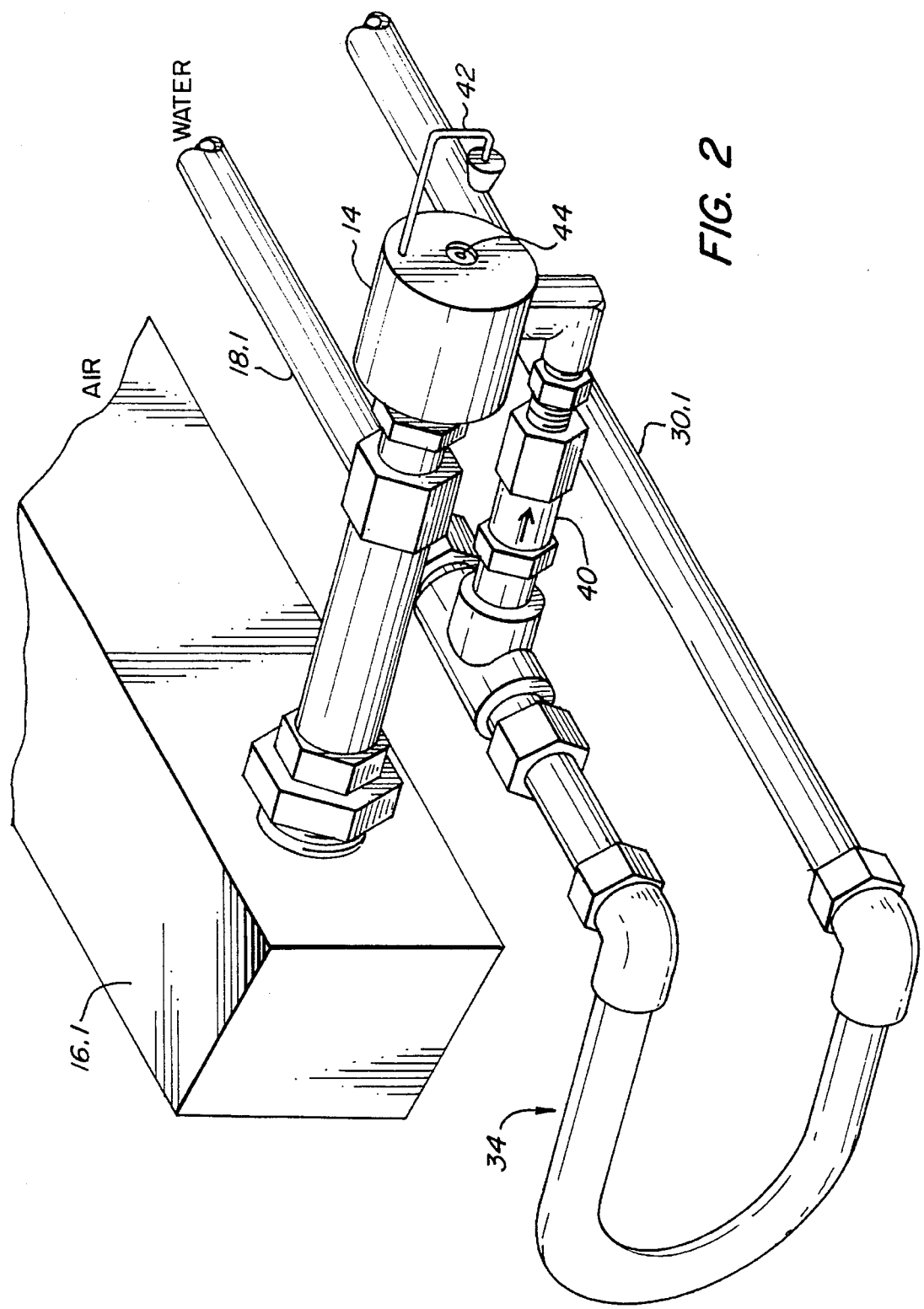

With reference to FIGS. 2–6 another aspect of the invention is shown. In FIG. 2 the fogger 14 is shown connected to a rectangular air line 16, though this shape is not required and a common tubular shape can be used. The fogger 14 is further connected to the primary water line 18 through suitable fittings and a check valve 40. The check valve is oriented to enable the passage of water while inhibiting the reverse flow of water and vibrations such as shock waves from the fogger 14 back into the primary water line 18. A check valve 40 is used with each of the foggers 14. The check valve is preferably operated so as to freely pass water to the fogger while rapidly closing in response to reverse flow from the fogger.

Each fogger 14 has a resonator 42 against which the stream of water and air emerging from an orifice 44 is impacted to produce the desired fog pattern, the fog pattern can be adjusted by moving the resonator toward or away from the orifice 44.

Having thus described a preferred embodiment of the invention its advantages can be appreciated. The fog patterns are consistent throughout the system while the fog produced from each fogger can be modulated by simultaneously adjusting the pressures in the same directions in the main air line 17 and in the primary water lines 18 as described in the aforementioned patent application. Variations from the described embodiment can be made without departing from the scope of the invention as set forth in the following claims.

What is claimed is:

1. A fogger bar assembly used to humidify a space wherein foggers are mounted in an elongate array to air and water conduits to be supplied with air and water at a pressure differential in which the air pressure exceeds the water pressure by a preselected amount and wherein the operation of the foggers introduces vibrations in the primary water conduit, comprising:

an elongate rigid air conduit and an elongate rigid primary water conduit;

a plurality of fogger assemblies operatively mounted and connected to the air and primary water conduits to provide fogging patterns therefrom, the fogger assemblies being spaced along the air and primary water conduits at desired spatial intervals so as to provide a desired fog distribution from the bar assembly;

check valves located between the primary water conduit and each of a said fogger assembly mounted thereto and so oriented as to check the flow of pressure waves from said fogger assemblies into said primary water conduit and enhance the dampening of vibrations from the operations of fogger assemblies and a second elongate rigid water conduit spaced from and extending along the primary water conduit and operatively connected in water flow relationship to the primary water conduit at spaced locations along the elongate array of foggers so as to provide enhanced dampening of vibrations introduced into the primary water conduit from the operation of the foggers and reduce variations of said pressure differentials in the respective foggers along the elongate array.

2. A fogger bar assembly as claimed in claim 1 wherein the second water conduit is operatively connected to the primary water conduit at near and far ends thereof.

3. A fogger bar assembly as claimed in claim 2 wherein the second water conduit is further connected to the primary water conduit at an intermediate location between said near and far ends.

4. A fogging system used to humidify a space wherein foggers are mounted in an elongate array to air and water conduits to be supplied with air and water at a pressure differential in which the air pressure exceeds the water pressure by a preselected amount comprising:

a plurality of arrays of fogger bar assemblies mounted in an air handler and stacked in a vertical spaced relationship with respect to each other;

each of said fogger bar assemblies including:

an air conduit and a primary water conduit;

a plurality of fogger assemblies operatively connected to the air and primary water conduits to provide fogging patterns therefrom, the fogger assemblies being spaced along the air and water conduits at desired spatial intervals so as to provide a desired fog distribution from the bar assembly; and a second water conduit extending along the primary water conduit and operatively connected to the primary water conduit at spaced locations along the elongate array of foggers so as to provide enhanced dampening of vibrations introduced into the primary water conduit from the operation of the foggers and reduce variations of said pressure differentials in the respective foggers along the elongate array;

a plurality of water pressure regulators respectively operatively connected to each primary water conduit so at to maintain a desired water pressure therein;

said pressure regulators being operatively connected so as to jointly vary the pressure in the primary water lines of the fogger bar assemblies in response to a control signal.

* * * * *